United States Patent

French, Jr.

(10) Patent No.: US 10,269,385 B1
(45) Date of Patent: Apr. 23, 2019

(54) DATA STORAGE DEVICE SWITCHING DISK SURFACES TO PERFORM SEEK USING SPIRAL TRACK

(71) Applicant: Western Digital Technologies, Inc., San Jose, CA (US)

(72) Inventor: James B. French, Jr., Whitefish, MT (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/002,357

(22) Filed: Jun. 7, 2018

(51) Int. Cl.
*G11B 5/09* (2006.01)
*G11B 19/20* (2006.01)

(52) U.S. Cl.
CPC .............. *G11B 19/20* (2013.01); *G11B 5/09* (2013.01)

(58) Field of Classification Search
None
See application file for complete search history.

(56) References Cited

U.S. PATENT DOCUMENTS

| | | | |
|---|---|---|---|
| 4,924,160 A | 5/1990 | Tung | |
| 5,594,924 A * | 1/1997 | Ottesen | G11B 5/012 348/E7.073 |
| 5,757,737 A * | 5/1998 | Tanaka | G11B 20/1217 369/30.22 |
| 6,118,739 A * | 9/2000 | Kishinami | G11B 7/0953 369/44.28 |
| 6,304,407 B1 * | 10/2001 | Baker | G11B 5/012 360/17 |
| 6,538,835 B1 | 3/2003 | Burton | |
| 7,656,604 B1 | 2/2010 | Liang et al. | |
| 7,843,662 B1 | 11/2010 | Weerasooriya et al. | |
| 8,634,154 B1 | 1/2014 | Rigney et al. | |
| 8,665,551 B1 | 3/2014 | Rigney et al. | |
| 8,743,504 B1 | 6/2014 | Bryant et al. | |
| 9,064,537 B1 * | 6/2015 | Nie | G11B 5/59627 |
| 9,076,490 B1 | 7/2015 | Nie et al. | |
| 9,208,810 B1 | 12/2015 | Nie et al. | |
| 2005/0068870 A1 * | 3/2005 | Narumi | G11B 7/00736 369/47.38 |
| 2013/0038959 A1 * | 2/2013 | Liang | G11B 5/59627 360/31 |

* cited by examiner

*Primary Examiner* — Peter Vincent Agustin

(57) ABSTRACT

A data storage device is disclosed comprising a first head actuated over a first disk surface comprising a first spiral track written from an outer diameter (OD) of the first disk surface to an inner diameter (ID) of the first disk surface, and a second head actuated over a second disk surface comprising a second spiral track written from an ID of the second disk surface to an OD of the second disk surface. A seek operation of the first head over the first disk surface is performed in order to access the first disk surface by reading the second spiral track from the second disk surface, seeking the second head over the second disk surface based on reading the second spiral track, and after seeking the second head over the second disk surface, accessing the first disk surface using the first head.

6 Claims, 5 Drawing Sheets

DATA STORAGE DEVICE SWITCHING DISK SURFACES TO PERFORM SEEK USING SPIRAL TRACK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
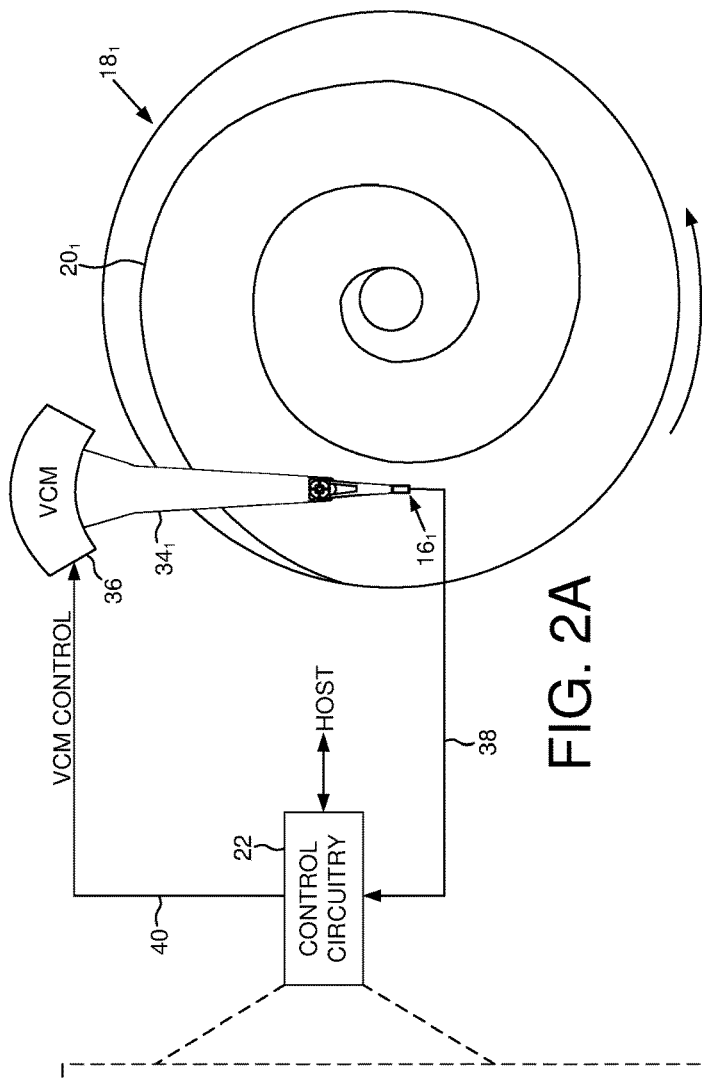
FIGS. 2A and 2B show a data storage device in the form of a disk drive according to an embodiment comprising a plurality of heads actuated over respective disk surfaces, wherein each disk surface comprises at least one spiral track.
Figure 2B:
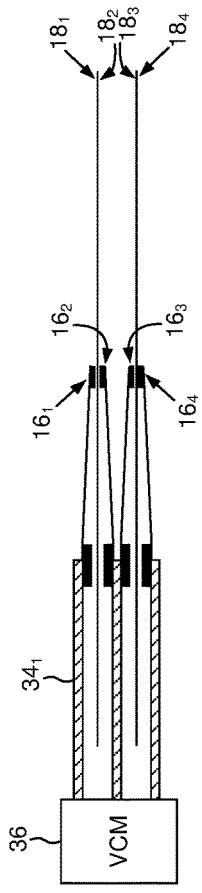
Figure 2C:
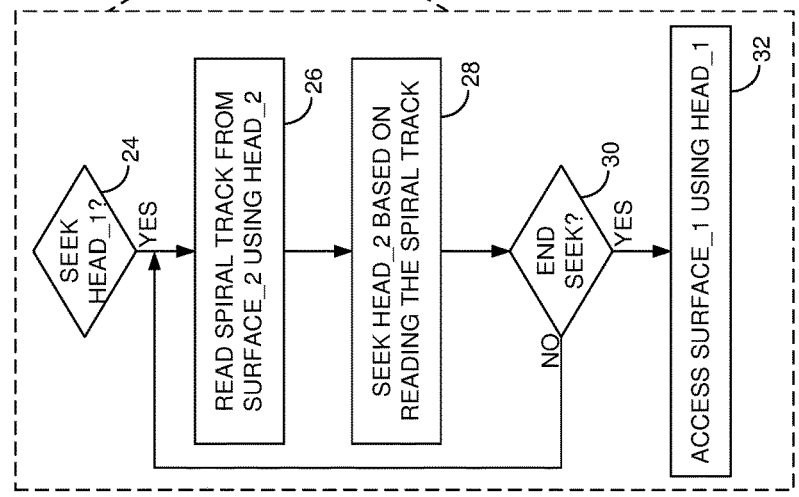
FIG. 2C is a flow diagram according to an embodiment wherein to seek a first head over a first disk surface, the spiral track on a second disk surface is read using a second head.

FIGS. 2A and 2B show a data storage device in the form of a disk drive according to an embodiment comprising a first head $16_1$ actuated over a first disk surface $18_1$ comprising a first spiral track $20_1$ (FIG. 3A) written from an outer diameter (OD) of the first disk surface $18_1$ to an inner diameter (ID) of the first disk surface $18_1$, and a second head $16_2$ actuated over a second disk surface $18_2$ comprising a second spiral track $20_2$ (FIG. 3B) written from an ID of the second disk surface $18_2$ to an OD of the second disk surface $18_2$. The disk drive further comprises control circuitry 22 configured to perform a seek operation (block 24) of the first head over the first disk surface in order to access the first disk surface by executing the flow diagram of FIG. 2C, wherein the second spiral track is read from the second disk surface (block 26) in order to seek the second head over the second disk surface based on reading the second spiral track (block 28). After seeking the second head over the second disk surface (block 30), the first disk surface is accessed using the first head (block 32).

Figure 1:
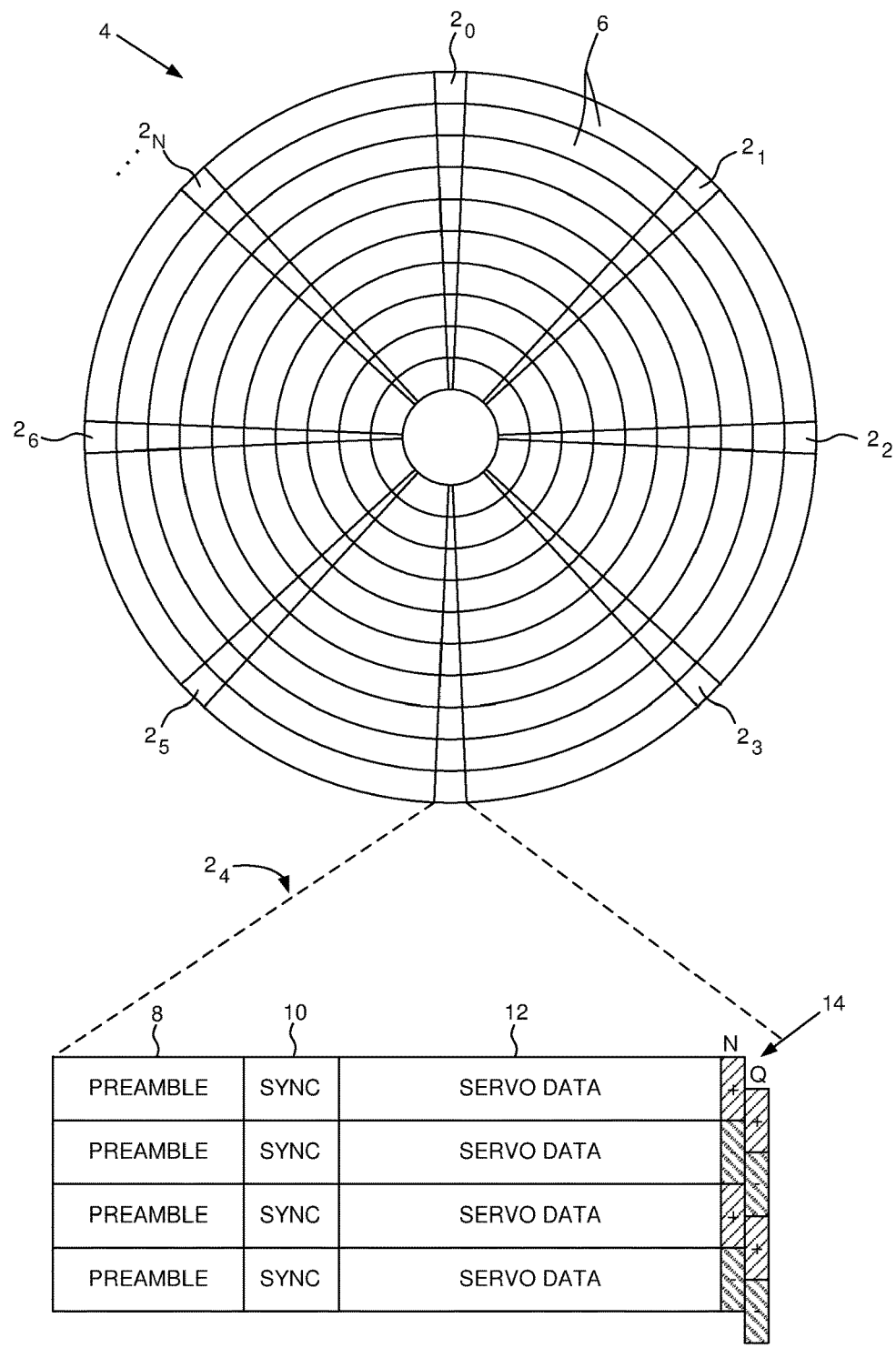
FIG. 1 shows a prior art disk format comprising a plurality of servo tracks defined by servo sectors.

In the embodiment of FIGS. 2A and 2B, each head $16_i$ is attached to a distal end of a respective actuator arm $34_i$ which is rotated about a pivot by a voice coil motor (VCM) 36. In one embodiment, the spiral track $20_i$ written on the disk surface $18_i$ provides the servo information for seeking/tracking operations in addition to, or instead of, conventional concentric servo sectors such as shown in FIG. 1. The embodiment of FIG. 2A shows a single spiral track $20_i$ written on a disk surface; however, in other embodiments multiple spiral tracks may be written on each disk surface. In addition, each spiral track may be written with any suitable slope so that each spiral track may span any suitable number of disk revolutions (e.g., the spiral track $20_1$ in the embodiment of FIG. 2A spans approximately 2.5 disk revolutions when written from the OD to the ID). When the spiral track $20_1$ is read by the head $16_1$, the control circuitry 22 demodulates position information from the read signal 38 to generate a position error signal filtered using a suitable servo compensator to generate a control signal 40 applied to the VCM 36 in order to servo the head $16_1$ radially over the disk surface $18_1$.

Figure 4A:
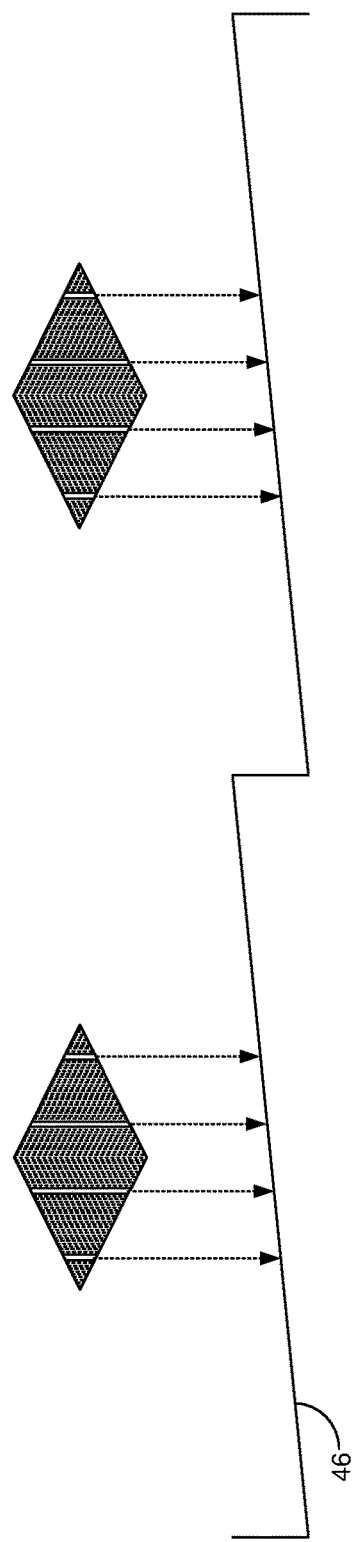
FIG. 4A shows an embodiment wherein a servo write clock is synchronized by clocking a modulo-N counter relative to when sync marks in the spiral tracks are detected.
Figure 4B:
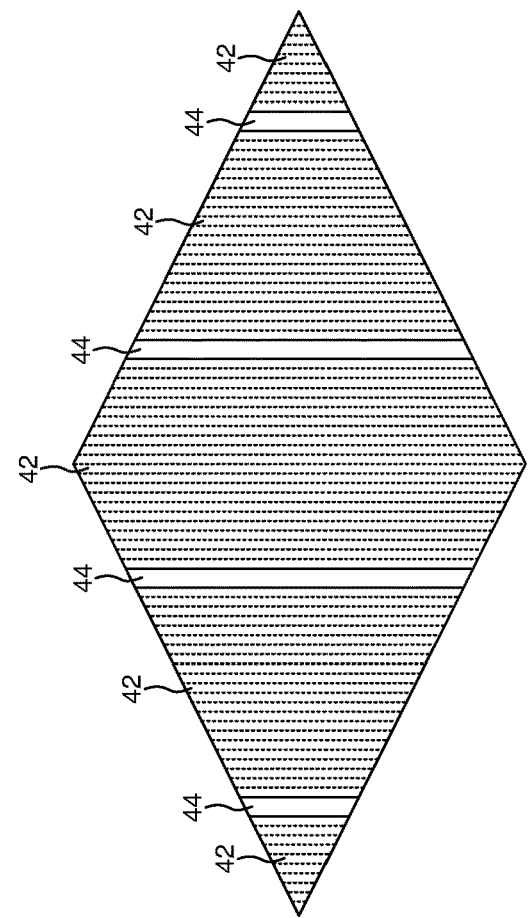
FIG. 4B shows an embodiment wherein an eye pattern is generated by reading the spiral track, including the sync marks in the spiral track.

FIG. 4B illustrates an embodiment wherein the read signal 38 comprises an "eye" pattern generated when the head $16_1$ crosses over the spiral track $20_1$. The eye pattern representing the spiral track crossing comprises high frequency transitions 42 interrupted by sync marks 44 at a predetermined interval. When the head $16_1$ moves in the radial direction, the eye pattern will shift (left or right) while the sync marks 44 remain fixed (ideally). The shift in the eye pattern (detected from the high frequency signal 42) relative to the sync marks 44 provides the off-track information (spiral position error signal (PES)) for servoing the head $16_1$.

FIG. 4A shows an embodiment wherein a saw-tooth waveform 46 is generated by clocking a modulo-N counter with a servo clock, wherein the frequency of the servo clock is adjusted until the sync marks 44 in the spiral track crossings are detected at a target modulo-N count value. The servo clock may be generated using any suitable circuitry, such as a phase locked loop (PLL). As each sync mark 44 in the spiral track crossings is detected, the value of the modulo-N counter represents the phase error for adjusting the PLL.

The sync marks 44 in the spiral track crossings may comprise any suitable pattern, and in one embodiment, a pattern that is substantially shorter than the sync mark 10 in the conventional concentric servo sectors 2 of FIG. 1. A shorter sync mark 44 allows the spiral tracks to be written to the disk surface using a steeper slope (by moving the head faster across the disk surface) which may reduce the time required to write each spiral track.

In one embodiment, the servo clock is further synchronized by generating a timing recovery measurement from the high frequency signal 42 between the sync marks 44 in the spiral track crossings. The timing recovery measurement may be generated in any suitable manner. In one embodiment, the servo clock is used to sample the high frequency signal 42 and the signal sample values are processed to generate the timing recovery measurement. The timing recovery measurement adjusts the phase of the servo clock (PLL) so that the high frequency signal 42 is sampled synchronously. In this manner, the sync marks 44 provide a coarse timing recovery measurement and the high frequency signal 42 provides a fine timing recovery measurement for maintaining synchronization of the servo clock.

Each spiral track may be written to the respective disk surfaces using any suitable technique. In one embodiment, an external servo writer may be used to write the spiral tracks to the disk surfaces before installing the disks into a production disk drive. In an alternative embodiment, the disks may be installed into a production disk drives and then the spiral tracks "self-written" to each disk surface. Any suitable technique may be employed to self-write the spiral tracks to the disk surfaces, wherein in one embodiment one or more bootstrap spiral tracks may be written to a disk surface before writing one or more product spiral tracks. An example of this embodiment is disclosed in U.S. Pat. No. 8,634,154 entitled "DISK DRIVE WRITING A SYNC MARK SEAM IN A BOOTSTRAP SPIRAL TRACK" the disclosure of which is incorporated herein by reference. The above reference patent also discloses an embodiment wherein the spiral tracks may comprise sync mark "seams" formed by changing the pattern of the sync mark 44 when writing the spiral tracks, wherein the sync mark seams may provide additional radial position information when servoing the heads based on the spiral tracks. In yet another embodiment, the spiral tracks may be written to a second disk surface while servoing the heads based on reading concentric servo sectors written to a first disk surface. An example of this embodiment is disclosed in U.S. Pat. No. 7,843,662 entitled "SERVOING ON CONCENTRIC SERVO SECTORS OF A FIRST DISK SURFACE TO WRITE A SPIRAL SERVO TRACK TO A SECOND DISK SURFACE" the disclosure of which is incorporated herein by reference.

Figure 3A:
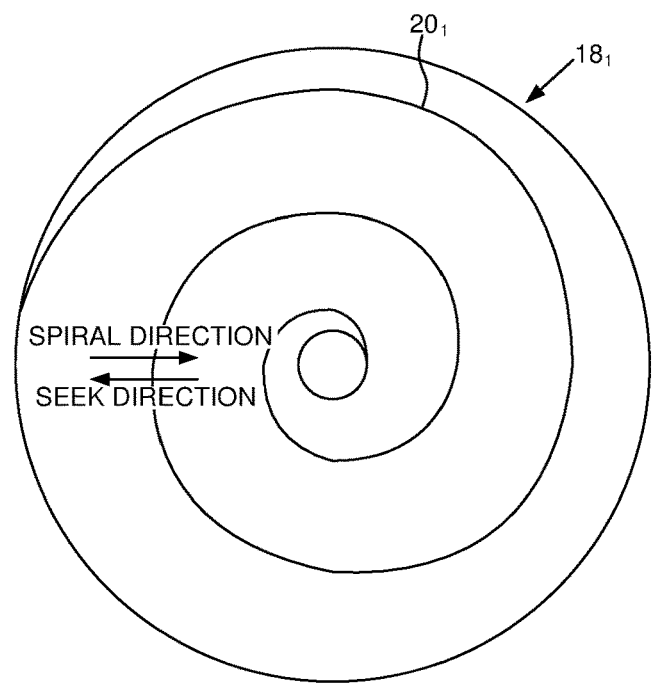
FIGS. 3A and 3B show a spiral tracks on different disk surfaces written in opposite radial directions.
Figure 3B:
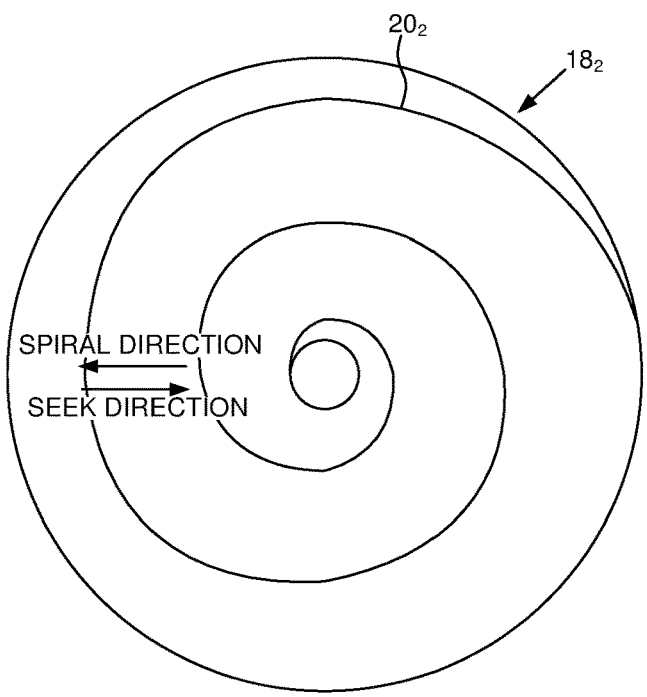

Referring again to the embodiment shown in FIG. 3A wherein spiral track $20_1$ is writing from the OD toward the ID of the disk surface $18_1$, if during a seek operation the head $16_1$ is moved in the same radial direction (OD toward ID) at the same velocity that the spiral track $20_1$ was written, the head $16_1$ never crosses the spiral track $20_1$ and therefore the spiral track $20_1$ cannot provide any position information during the seek. Even if the seek velocity is different (slower or faster) than the velocity when writing the spiral track $20_1$, there would be a lower frequency of spiral track crossings resulting in low performance (or even failed) seeks. Conversely if during a seek operation the direction of the seek is in the opposite radial direction (ID toward OD) of the spiral track $20_1$, the number of spiral track crossings increases significantly since the spiral track $20_1$ is effectively moving toward the head $16_1$ during the seek rather than moving away from the head $16_1$. Accordingly in one embodiment when accessing the first disk surface $18_1$ requires seeking the head $16_1$ in the same radial direction as the written spiral track $20_1$ (OD toward ID), the control circuitry 22 performs the seek by switching to the second disk surface $18_2$ in order to read spiral track $20_2$ using head $16_2$. Since spiral track $20_2$ is written in the opposite radial direction (ID toward OD) of spiral track $20_1$, there is significantly more spiral track crossings to facilitate the seek operation. At the end of the seek operation, the control circuitry switches back to head $16_1$ in order to access the first disk surface $18_1$.

Figure 5:
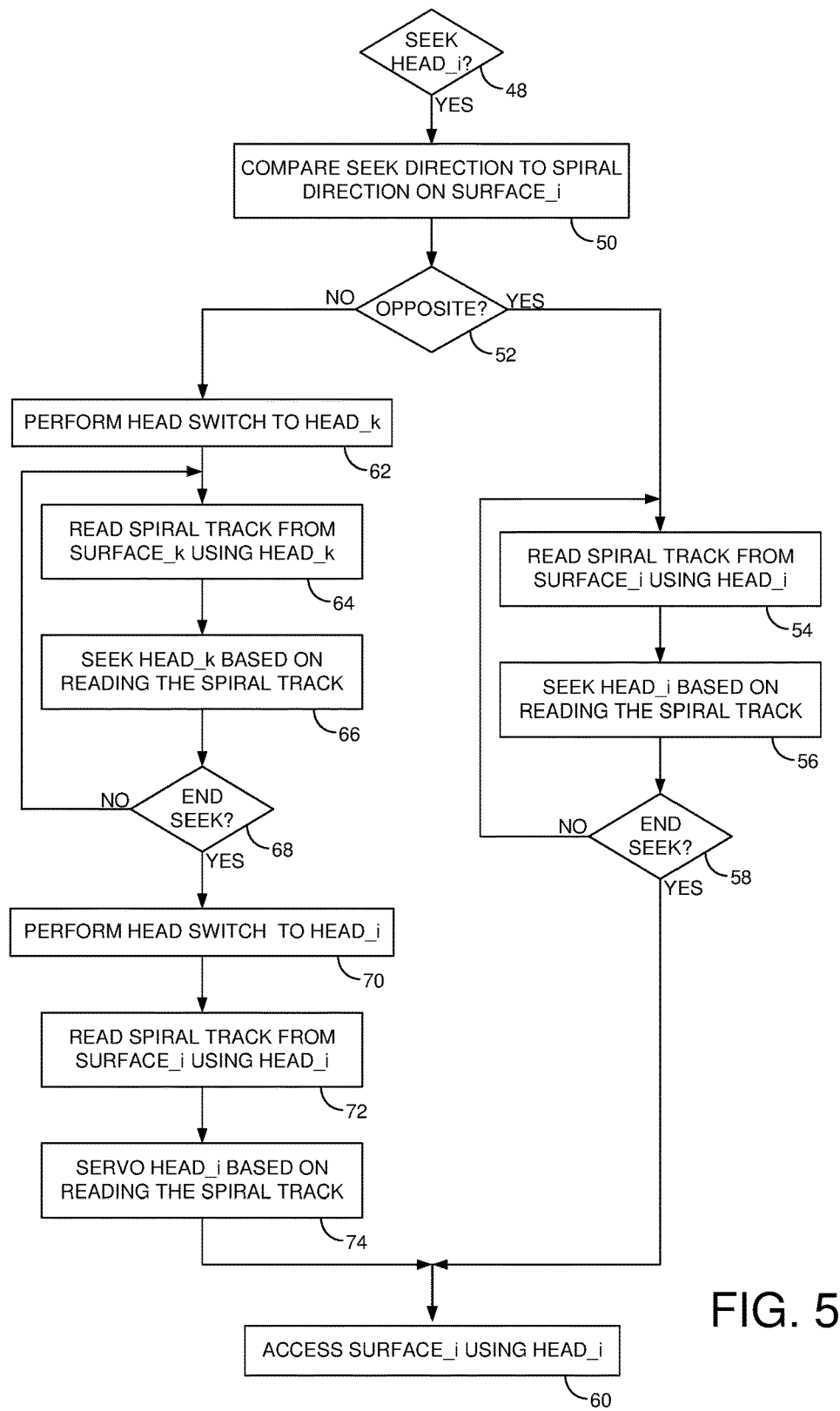
FIG. 5 is a flow diagram according to an embodiment wherein during a seek operation the disk surface having a spiral track written in the direction opposite the seek direction is selected for seeking the target head to a target data track.

An example of this embodiment is understood with reference to the flow diagram of FIG. 5, wherein when accessing a disk surface requires seeking a corresponding target head to a target data track (block 48), the direction of the seek is compared to the written direction of the spiral track(s) on the target disk surface (block 50). When the seek direction is opposite the written direction of the spiral track(s), the spiral track(s) on the target disk surface are read using the target head (block 54) in order to seek the target head to the target data track (block 56). At the end of the seek operation (block 58) the target head is used to access the target data track (block 60). When the seek direction is the same as the written direction of the spiral track (block 52), the control circuitry switches to a different head where the spiral track(s) of the corresponding alternate disk surface are written in the opposite radial direction as the seek direction (block 62). The spiral track(s) on the alternate disk surface are read using the corresponding head (block 64) in order to seek the head across the alternate disk surface, thereby seeking the target head toward the target data track on the target disk surface (block 66). At the end of the seek operation (block 68) the control circuitry switches back to the target head (block 70) in order to read the spiral track(s) on the target disk surface (block 72) and servo the target head based on the spiral track crossings until the target head reaches the target data track (block 74). The target head is then used to access the target data track on the target disk surface while tracking the center of the target data track based on the spiral track crossings (block 60).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored in a non-volatile semiconductor memory (NVSM) and read into a volatile semiconductor memory when the data storage device is powered on. In yet another embodiment, the control circuitry comprises suitable logic circuitry, such as state machine circuitry.

In various embodiments described above, a disk drive may include a magnetic disk drive, an optical disk drive, a hybrid drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk surface comprising a first spiral track written from an outer diameter (OD) of the first disk surface to an inner diameter (ID) of the first disk surface;
   a first head actuated over the first disk surface;
   a second disk surface comprising a second spiral track written from an ID of the second disk surface to an OD of the second disk surface;
   a second head actuated over the second disk surface; and
   control circuitry configured to perform a seek operation of the first head over the first disk surface in order to access the first disk surface by at least:
      reading the second spiral track from the second disk surface;
      seeking the second head over the second disk surface based on reading the second spiral track;
      after seeking the second head over the second disk surface, accessing the first disk surface using the first head;
      comparing a direction of the seek with the written direction of the first spiral track; and
      seeking the second head over the second disk surface based on reading the second spiral track when the direction of the seek is in the same direction as the written direction of the first spiral track.

2. The data storage device as recited in claim 1, wherein after seeking the second head over the second disk surface, the control circuitry is further configured to:
   perform a first head switch operation to switch from the first head to the second head before seeking the second head; and
   perform a second head switch operation to switch from the second head to the second head after seeking the second head.

3. The data storage device as recited in claim 2, wherein after performing the second head switch operation, the control circuitry is further configured to:
   read the first spiral track from the first disk surface;
   servo the first head over the first disk surface based on reading the first spiral track in order to position the first head over a target data track on the first disk surface; and
   access the target data track using the first head.

4. A method of operating data storage device, the method comprising performing a seek operation of a first head over a first disk surface in order to access the first disk surface by at least:
   using a second head to read a second spiral track from a second disk surface;
   seeking the second head over the second disk surface based on reading the second spiral track;
   after seeking the second head over the second disk surface, servoing the first head over the first disk surface by reading a first spiral track from the first disk surface in order to access the first disk surface using the first head;
   comparing a direction of the seek with the written direction of the first spiral track; and
   seeking the second head over the second disk surface based on reading the second spiral track when the direction of the seek is in the same direction as the written direction of the first spiral track.

5. The method as recited in claim 4, wherein after seeking the second head over the second disk surface, the method further comprising:
   performing a first head switch operation to switch from the first head to the second head before seeking the second head; and
   performing a second head switch operation to switch from the second head to the second head after seeking the second head.

6. The method as recited in claim 5, wherein after performing the second head switch operation, the method further comprises:
   reading the first spiral track from the first disk surface;
   servoing the first head over the first disk surface based on reading the first spiral track in order to position the first head over a target data track on the first disk surface; and
   accessing the target data track using the first head.

* * * * *